(12) United States Patent
Kim et al.

(10) Patent No.: US 7,072,254 B2
(45) Date of Patent: Jul. 4, 2006

(54) OPTICAL PICKUP DEVICE AND RECORDING MEDIUM USED THEREFOR

(75) Inventors: Dae-sik Kim, Gyeonggi-do (KR);
Soon-kyo Hong, Seoul (KR);
Chul-woo Lee, Gyeonggi-do (KR);
Ho-cheol Lee, Gyeonggi-do (KR);
Kun-ho Cho, Gyeonggi-do (KR);
Jang-hoon Yoo, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 716 days.

(21) Appl. No.: 10/217,330

(22) Filed: Aug. 13, 2002

(65) Prior Publication Data
US 2003/0076769 A1 Apr. 24, 2003

(30) Foreign Application Priority Data
Aug. 13, 2001 (KR) .............................. 2001-48738

(51) Int. Cl.
*G11B 5/09* (2006.01)
*G11B 7/24* (2006.01)
(52) U.S. Cl. .................. 369/47.1; 369/275.1; 369/53.2
(58) Field of Classification Search .................... None
See application file for complete search history.

(56) References Cited
U.S. PATENT DOCUMENTS
6,058,095 A 5/2000 Yamamoto et al.
6,751,021 B1 * 6/2004 Hendriks et al. ........... 359/566
2002/0172133 A1 11/2002 Kim et al.

FOREIGN PATENT DOCUMENTS
JP 6-302005 10/1994
JP 10-123410 5/1998
JP 11-7651 1/1999
JP 2000-331374 11/2000
WO PCT/JP95/00374 3/1995

* cited by examiner

*Primary Examiner*—Muhammad Edun
(74) *Attorney, Agent, or Firm*—Stein, McEwen & Bui, LLP

(57) ABSTRACT

An optical pickup device includes a light unit for irradiating a light beam having a wavelength longer than 650 nm onto a recording medium and receiving and detecting a light beam reflected by the recording medium, and an objective tens formed of a single lens having an NA of 0.7 or more to form a light spot on the recording medium by condensing an incident light beam emitted from the light unit. A recording medium has a recording density of a DVD family or more and is formed of a material suitable for a long wavelength of 700 nm or more so that a reproduction signal by a reflectance of a recording surface is optimized. Thus, a compact high density optical recording/reproducing apparatus which is inexpensive and has high performance can be realized.

40 Claims, 7 Drawing Sheets

OPTICAL PICKUP DEVICE AND RECORDING MEDIUM USED THEREFOR

CROSS-REFERENCE TO RELATED APPLICATION

This application claims the benefit of Korean Application No. 2001-48738 filed Aug. 13, 2001, in the Korean Intellectual Property Office, the disclosure of which is incorporated herein by reference.

BACKGROUND OF THE INVENTION

1. Field of the Invention

The present invention relates to an optical pickup device providing a high performance at a low cost and a recording medium used therefor.

2. Description of the Related Art

In order to increase information recording density with respect to a recording medium, the size of a light spot irradiated on a recording medium for recording and/or reproduction needs to be reduced. Since the size of a light spot is proportional to the wavelength λ of a light beam used and inversely proportional to the numerical aperture (NA) of an objective lens, as shown below in Formula 1, the recording density increases as the NA of the objective lens increases:

$$\text{Size of light spot} \propto \lambda/NA \qquad \text{Formula 1}$$

However, as is generally known, an objective lens formed of a single lens is difficult to manufacture to have a high NA, for example, 0.7 or more, while satisfying allowable conditions of optical aberration (decenter>4 μm and tilt>2' when a slope angle is 55 degrees and an OPD=0.03λ rms) due to manufacturing limitations. This is because the material for the lens is limited and the shape of a spherical surface of the lens is not designed to be suitable for injection. That is, in an objective lens formed of a single lens having a short focal length and a high NA, the curvature of a spherical surface thereof increases and an angle of a tangent line at an effective surface becomes over 55 degrees. This slope angle makes manufacture of a mold difficult and decreases an allowable decenter between lens surfaces when a lens is manufactured, thus dropping production yield. Thus, an objective lens which is easy to manufacture and achieves an assembly allowance while having a high NA is needed.

Also, since an effect of wavefront aberration according to a degree of the thickness of a recording medium is sensitive to an increase as an NA increases, the thickness of a recording medium (i.e., the thickness of a protective layer for protecting a recording surface) needs to be thin.

Meanwhile, as is widely known in the field of technology to which the present invention pertains, a DVD (digital versatile disc) has a 0.6 mm thick protective layer to protect a recording surface of a recording medium. When the protective layer is thick as in the DVD, a sufficient working distance (WD) between an objective lens and a recording surface of a recording medium is needed. The thickness of the protective layer serves as a limit in increasing of the NA of the objective lens to minimize the objective lens formed of a single lens and high density recording. This is because, when an objective lens having a working distance sufficient to prevent contact with a recording medium and to enable a small diameter is manufactured, the curvature of a spherical surface increases and the amount of allowable decenter between lens surfaces and the amount of an allowable angle of view decreases and productivity deteriorates.

Figure 1:
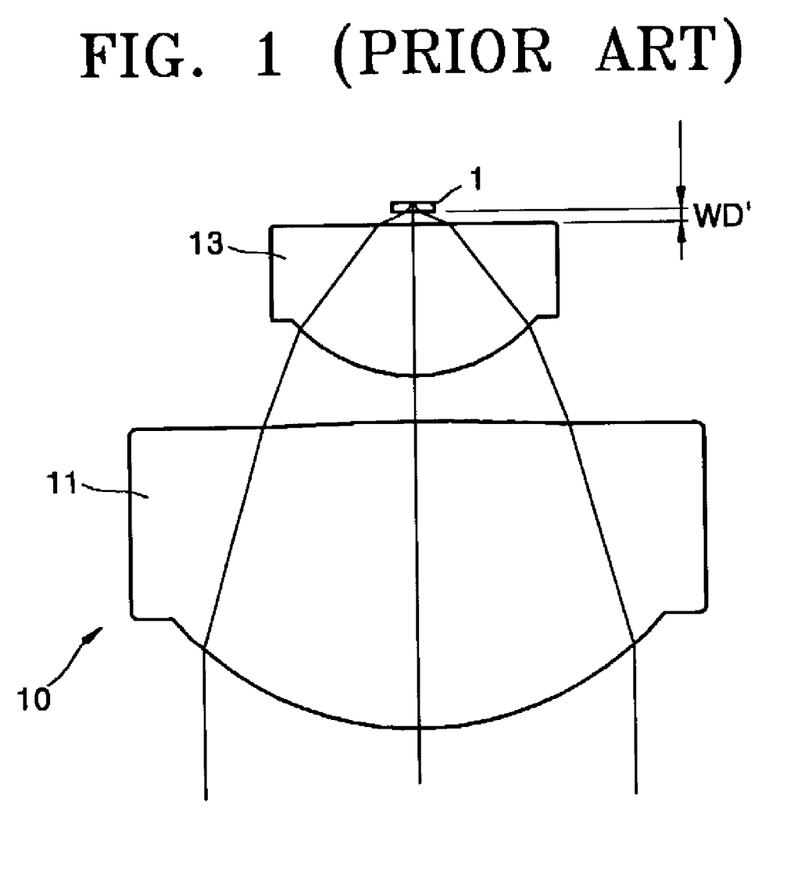
FIG. 1 shows a conventional objective lens formed of two lenses.

To satisfy the requirements for the thickness of a thin protective layer and overcome the limit of the objective lens formed of a single lens, an objective lens 10 formed of two lenses, such as the lenses disclosed in Japanese Patent Publication No. 10-123410, has been developed as shown in FIG. 1. Referring to FIG. 1, the conventional objective lens 10 includes a first lens 11 to condense an incident light beam, and a second lens 13 disposed between the first lens 11 and a recording medium 1 to increase the NA of the objective lens 10. When a light beam having a red wavelength, for example, 635 nm or 650 nm is used, to secure assembly allowance, a curvature is assigned to four lens surfaces so that a high NA of 0.7 or more can be obtained.

The objective lens 10 has at least one aspheric surface and a low dispersion material is used to reduce chromatism. The NA of 0.7 or more can be obtained by using a low dispersion material having an Abbe's number of 40 or more in the helium line d (wavelength of 587.5618). Also, an NA of 0.8 or more can be obtained by using a low dispersion material having an Abbe's number of 60 or more in the helium line d.

Assuming that the focal length of the first lens 11 is f1 and the synthesized focal length of the two lenses 11 and 13 (i.e., the total focal length of the objective lens 10) is f, the objective lens 10 satisfies the inequality of 1.7<f1/f<2.5.

Also, when the thickness T' of a transparent protective layer used to protect the recording surface of the recording medium 1 with respect to the NA satisfies conditions of the following Formula 2, correcting aberration of the objective lens 10 is possible:

$$\text{When } 0.7 \leq NA < 0.8, \ T' \leq 0.32 \text{ mm};$$

$$\text{When } 0.8 \leq NA < 0.9, \ T' \leq 0.20 \text{ mm; and}$$

$$\text{When } 0.9 \leq NA, \ T' \leq 0.11 \text{ mm}. \qquad \text{Formula 2}$$

If the objective lens 10 satisfies the condition that n1>n2, where n1 is the refractive index of a lens having a relatively greater curvature of the two lenses 11 and 13 and n2 is the refractive index of a lens having a relatively smaller curvature, and assuming that BW is the diameter of an incident light beam and WD' is a working distance, the objective lens 10 satisfies the condition that 1.0≤BW<4.5 and 0.05≤WD'. The diameter BW of the light beam and the working distance WD' satisfy the conditions of Formula 3 shown below with respect to the NA of the objective lens 10:

$$\text{When } 0.7 \leq NA < 0.8, \ WD' \leq 0.25676BW + 0.039189;$$

$$\text{When } 0.8 \leq NA < 0.9, \ WD' \leq 0.14054BW - 0.064865;$$
$$\text{and}$$

$$\text{When } 0.9 \leq NA, \ WD' \leq 0.096429BW - 0.244640. \qquad \text{Formula 3}$$

The conventional objective lens 10 can realize a high NA of 0.8 or more with respect to a recording medium having a protective layer of which the thickness is thinner than that of a DVD. Also, the objective lens 10 formed of two lenses 11 and 13 satisfies the requirement of a thin protective layer and can overcome the limit of an objective lens formed of a single lens. However, the conventional objective lens 10 formed of two lenses needs a holder to maintain the distance between the lenses 11 and 13 (i.e., an air gap). Thus, since the conventional objective lens 10 has a high NA, a distance allowance and inclination allowance between the lenses 11 and 13 are very strictly obeyed and the production yield deteriorates. Such a deterioration in the production yield causes an increase in the manufacturing cost of an optical pickup device using the objective lens 10. Also, when the conventional objective lens 10 is used, since an actuator is needed to perform focus control and so forth by integrally driving the two lenses 11 and 13, a recording/reproducing apparatus is made complicated and huge.

Japanese Patent Publication No. 10-123410 discloses an example in which the conventional objective lens 10 is designed with respect to a wavelength of 635 nm and 650 nm. This signifies that an optical pickup device employing the conventional objective lens 10 uses a light source for a 635 nm or 650 nm wavelength.

However, since the unit price of the light source for a 635 nm or 650 nm wavelength is very high as compared to a light source for a relatively longer wavelength (for example, a light source used for a recording medium of a CD family), it is difficult to lower the price of an optical pickup device.

SUMMARY OF THE INVENTION

To solve the above and other problems, it is an object of the present invention to provide an optical pickup device providing a high performance at a low cost which includes a light source for a long wavelength and an objective lens formed of a single lens which has an improved structure to overcome the limits in the conventional single-lens objective lens and the problems of the conventional dual-lens objective lens, and a recording medium in a new format used for the optical pickup device.

Additional objects and advantages of the invention will be set forth in part in the description which follows and, in part, will be obvious from the description, or may be learned by practice of the invention.

To achieve the above and other objects, an optical pickup device according to an embodiment of the invention includes a light emitter/detector unit that emits a light beam having a wavelength longer than 650 nm to be focused onto a recording medium and which receives and detects the light beam reflected by the recording medium, and an objective lens formed of a single lens having a numerical aperture (NA) of 0.7 or more to form a light spot on the recording medium by condensing an incident light beam emitted from the light emitter/detector unit.

According to an aspect of the present invention, the light beam has a wavelength of 700 nm or more.

According to another aspect of the present invention, a working distance of the objective lens is less than a thickness of a center of the objective lens, and the thickness of the center of the objective lens is 0.6 times or more an effective diameter thereof.

According to still another aspect of the present invention, when the NA of the objective lens is 0.7 or more, the working distance of the objective lens satisfies the condition that $WD \leq \alpha BW - 0.2T$, in which WD is the working distance, BW is a diameter of an incident light beam, T is a thickness of the center of the objective lens, $\alpha = 1/(2 \tan \theta)$, and $\theta = \text{Arc sin}(NA)$.

According to a further aspect of the present invention, the objective lens comprises an effective diameter of 2.0 mm or less, a maximum inclination angle of 55° or less, or has two aspherical surfaces.

According to a still further aspect of the present invention, the light emitter/detector unit comprises a light module comprising a light source to emit the light beam having the wavelength longer than 650 nm, a holographic optical element to selectively diffract making the light beam between the light source and the objective lens proceed straight or diffracted, and a photodetector to receive and detect the light beam reflected from the recording medium and having passed through the objective lens and the holographic optical element.

According to a yet further aspect of the present invention, the optical pickup device further comprises a mirror between the light emitter/detector unit and the objective lens to change a path of an incident light beam to follow a substantially perpendicular path.

According to an additional aspect of the present invention, the optical pickup device further comprises a reflection-type compound prism provided between the light emitter/detector unit and the objective lens and which makes a light beam input from the light emitter/detector unit proceed while a size of the light beam is reduced in a height direction by using a difference in angles between surfaces of the prism, and to change a path of the light beam in a direction substantially perpendicular to the path of the light beam which entered the reflection-type compound prism.

According to a still additional aspect of the present invention, a part of the objective lens is disposed lower than a top end portion of the light beam incident on the reflection-type compound prism.

According to another embodiment of the present invention, a recording medium has a recording density of a DVD family or more and is formed of a material suitable for a long wavelength of 700 nm or more so that a reproduction signal by a reflectance of a recording surface is optimized.

According to an aspect of the present invention, a thickness of the recording medium, that is, the distance from a light incident surface to a recording surface, satisfies an inequality, 40 nm<thickness of recording medium<0.6 mm.

According to another aspect of the present invention, the recording medium is formed of a material having a characteristic which is the same as or similar to that of a recording medium of a CD family.

BRIEF DESCRIPTION OF THE DRAWINGS

The above and other object and advantages of the present invention will become more apparent and more readily appreciated by describing in detail embodiments thereof with reference to the accompanying drawings in which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
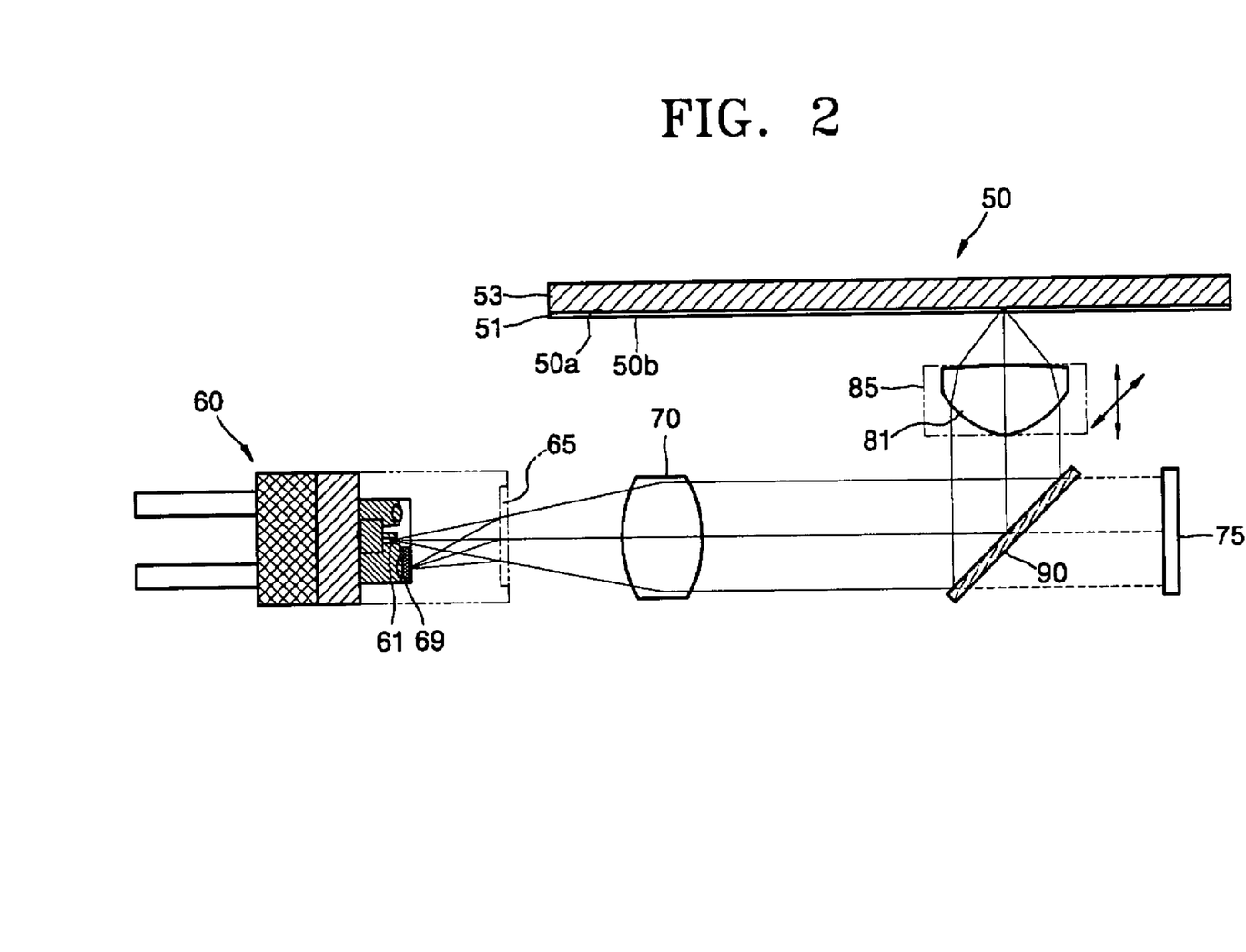
FIG. 2 shows an optical structure of an optical pickup device according to an embodiment of the present invention.

Referring to FIG. 2, an optical pickup device according to an embodiment of the present invention includes a light emitter/detector unit 60 which emits a light beam having a predetermined wavelength to proceed toward a recording medium 50 having a substrate 53, a recording surface 50a, a transparent protective layer 51, and a light incident surface 50b, and to receive and detect a light beam reflected by the recording medium 50. An objective lens 81 condenses an incident light beam emitted from the light emitter/detector unit 60 and forms a light spot on the recording surface 50a of the recording medium 50.

The light emitter/detector unit 60 includes a light source 61, a holographic optical element 65, and a photodetector 69. The light source 61 is a light source for a long wavelength to emit a light beam having a wavelength longer than 650 nm. According to an aspect of the invention, the light source 61 emits a light beam having a wavelength longer than 700 nm, for example, 780 nm. The light source 61 is a semiconductor laser, such as an edge emitting laser or a vertical cavity surface emitting laser, according to embodiments of the invention.

Figure 3:
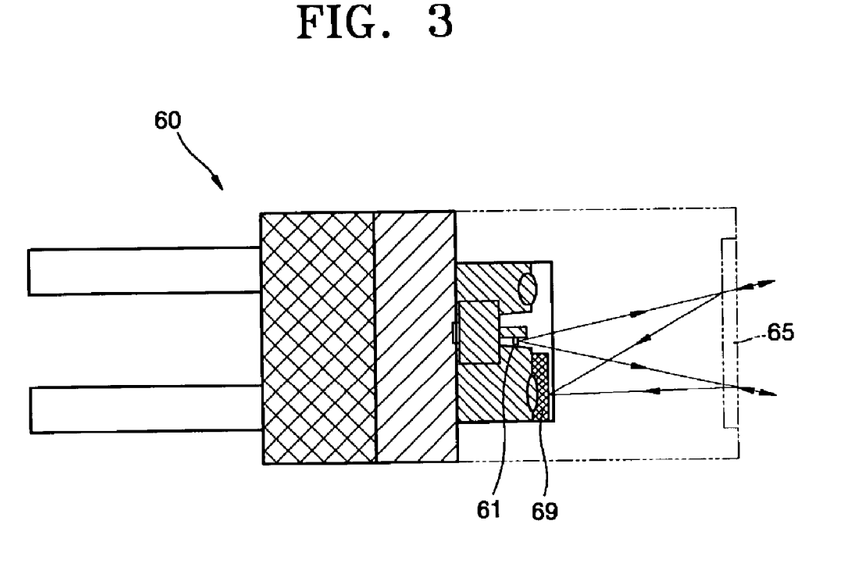
FIG. 3 shows an embodiment of a light unit for use in the optical pickup device shown in FIG. 2.

The holographic optical element 65 is a optical path changer which selectively transmits an incident light beam to proceed straight or diffracts the incident light beam according to the incident direction of the light beam. For example, as shown in FIG. 3, the holographic optical element 65 transmits the incident light beam emitted from the light source 61 to proceed straight and diffracts the incident light beam reflected by the recording medium 50 to proceed toward the photodetector 69 disposed beside the light source 61. However, it is understood that other configurations are possible.

The photodetector 69 detects an information signal and an error signal by receiving the light beam reflected by the recording surface 50a of the recording medium 50 and diffracted by the holographic optical element 65. In the shown embodiment, the holographic optical element 65 is formed to perform a knife edge role to the incident light beam reflected by the recording medium 50 so as to detect a focus error signal in a knife edge method, or to serve as a lens causing astigmatism to the light beam to detect a focus error signal in an astigmatism method, so that the photodetector 69 can detect the focus error signal. To detect the focus error signal using the knife edge method, the holographic optical element 65 of the shown embodiment is able to divide an incident light beam in two sections.

In the shown embodiment, a portion of the photodetector 69 receives one part of the light beam divided by the holographic optical element 65. The photodetector 69 has two sections to detect the focus error signal in the knife edge method. In an on-focus state, the one light beam is positioned in the middle of the two sections of the photodetector 69. When the light beam is deviated to the near and far with respect to the on-focus, the one light beam moves up and down with respect to the two sections of the photodetector 69. Thus, the focus error signal (i.e., a degree of deviation of the objective lens 81) is measured.

The other part of the light beam divided by the holographic optical element 65 can be used to detect a tracking error signal.

FIG. 3 shows an example of an optical module of the light emitter/detector unit 60 in which the holographic optical element 65 is provided as an optical path changer. The structure of the optical module of the light unit 60 may be variously modified. When the wavelength of the light source 61 is determined to be 780 nm, since a conventional 780 nm holographic laser module, which has a high output and is also inexpensive, can be used as the optical unit 61, a low priced optical pickup device can be configured. When the light emitter/detector unit 60 of the optical pickup device according to the present invention uses the optical module structure as shown in FIG. 3, a compact optical structure is possible. However, it is understood that the light source 61 can be separate from the photodetector 69, and the light source 61 need not be coplanar with the photodetector 69.

The objective lens 81 forms a light spot on the recording surface 50a of the recording medium 50 by condensing the incident light beam emitted from the light source 61. The objective lens 81 is mounted on a small actuator 85 and is driven by a controller (not shown) in focusing and tracking directions. Since the basic structure of the actuator 85 and controller is well known in the technical field to which the present invention pertains, a detailed description and illustration thereof will be omitted.

According to an aspect of the invention, the objective lens 81 has an NA of 0.7 or more, is optimized to be able to condense a light beam having a wavelength of, for example, 780 nm on the recording medium 50 without aberration, and has a working distance as short as possible, thus satisfying the conditions of a thin optical pickup device such as a DVD. For this purpose, the objective lens 81 is a single lens having an NA of 0.7 or more with respect to a light beam having a wavelength of, for example, 780 nm so that a recording density over a DVD family can be achieved by combination of the wavelength of the light source 61. Further, the objective lens 81 has no air gap and instead utilizes only two surfaces to focus the incident light beam according to an embodiment of the invention.

According to another aspect of the invention, the objective lens 81 has a working distance shorter than a thickness of a center of the objective lens 81 so that the objective lens 81 has a working distance that is as short as possible, which allows the optical pickup device to be made thin. Further, the thickness of the center is 0.6 times greater than an effective diameter of the objective lens 81 (i.e., the diameter on which light to be focused is incident on the objective lens 81). Also, when the NA of the objective lens 81 is 0.7 or more (NA≧0.7), the objective lens 81 has a working distance satisfying Formula 4 set forth below. Here, the working distance is a distance from the surface of the objective lens 81 to the light incident surface 50b (typically a surface of the protective layer 51) of the recording medium 50.

$$WD \leq \alpha BW - 0.2T, \qquad \text{Formula 4}$$

where WD is a working distance,

BW is a diameter of an incident light beam,

T is a thickness of the center of the objective lens 81, $\alpha = 1/(2 \tan \theta)$, and $\theta = \text{Arc sin}(NA)$.

The objective lens 81 has an effective diameter (a diameter of the objective lens 81 which focuses the incident light) of 2.0 mm or less according to an aspect of the invention. Also, both surfaces of the objective lens 81 are formed of aspherical surfaces in order to remove optical aberration and increase decenter between lens surfaces according to another aspect of the invention. According to an aspect of the invention, the maximum inclination angle of the objective lens 81 is less than 55° considering manufacturing constraints. Here, the objective lens 81 can be formed to satisfy at least one of the conditions of the effective diameter, the aspherical surfaces, and the maximum inclination angle.

Figure 4:
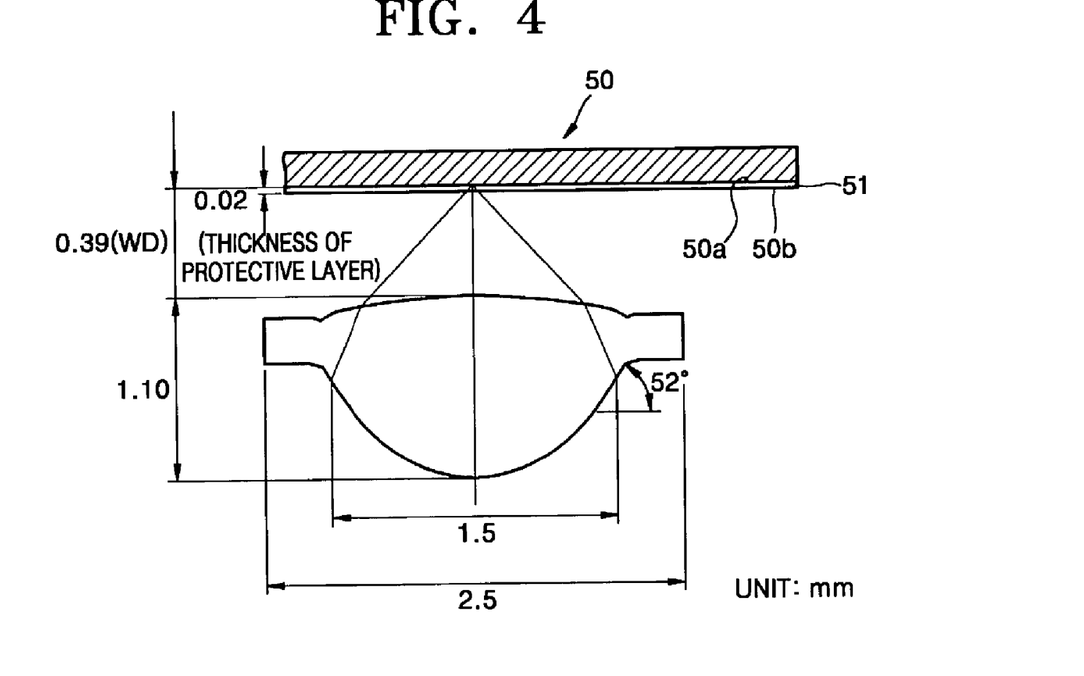
FIG. 4 shows an embodiment of the objective lens used in the optical pickup device shown in FIG. 2.

It is found by the present inventor that the objective lens 81 according to an aspect of the present invention, as shown in FIG. 4, is optimized at a working distance of 0.39 mm when NA=0.72, T=1.1, and BW=1.5 mm. Here, the maximum inclination angle of the surface of the objective lens 81 is 52°, which sufficiently satisfies the condition of the maximum inclination angle being less than 55°.

The data of the objective lens 81 shown in FIG. 4 are design examples in which the thickness of a protective layer of the recording medium (the distance from a light incident surface 50b to the recording surface 50a) is 0.02 mm, a glass material having a refractive index of 1.70127 at a wavelength of 780 nm is used for the objective lens 81, and the objective lens 81 is designed by using an aspherical surface of an odd function. Table 1 shows an example of design data of an aspherical surface 1 to which a light beam emitted from the light source 61 is input and an aspherical surface 2 from which the light beam is output.

TABLE 1

| Surface | Radius of curvature (mm) |
| --- | --- |
| Aspherical surface 1 | 0.76434<br>K = −1.088006<br>A1 = 0.175758E+00, A2 = 0.413117E−01,<br>A3 = 0.493205E−01, and A4 = −0.100285E+00 |
| Aspherical surface 2 | −8.17342<br>K = 134.737501<br>A1 = 0.476128E4+00, A2 = −0.261623E+01,<br>A3 = 0.804453E+01, and A4 = −0.986830E+01 |

Figure 5:
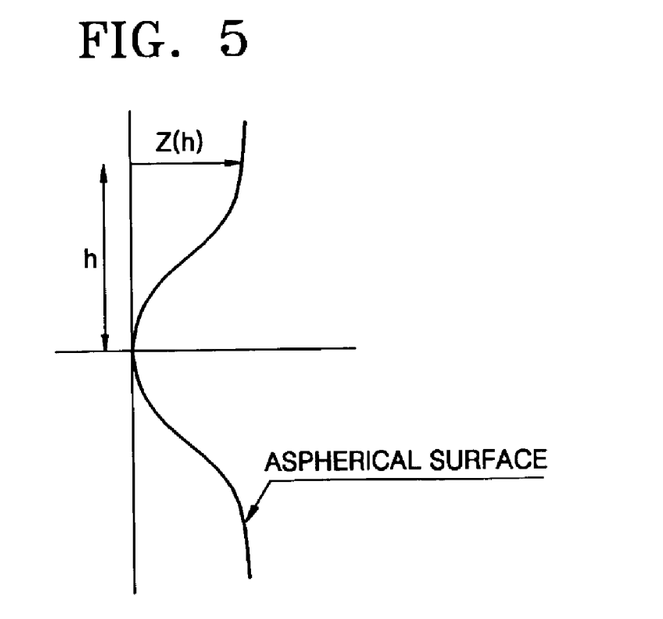
FIG. 5 graphically illustrates a formula of an aspherical surface.

In Table 1, K is a conic constant of each of the aspherical surfaces 1 and 2, and A1–A4 are coefficients of the aspherical surface. An aspherical surface equation to the aspherical surfaces 1 and 2 can be expressed in as set forth below in Formula 5, when the depth from the apex of the aspherical surface is Z(h).

$$z = \frac{\frac{h^2}{R}}{1 + \sqrt{1 - (1+K)\frac{h^2}{R^2}}} + \sum_j A_j h^j \quad \text{Formula 5}$$

In Formula 5, h is a height from an optical axis, R is a radius of curvature, K is a conic constant of an aspherical surface, and $A_j$ is a coefficient of an aspherical surface.

Figure 6:
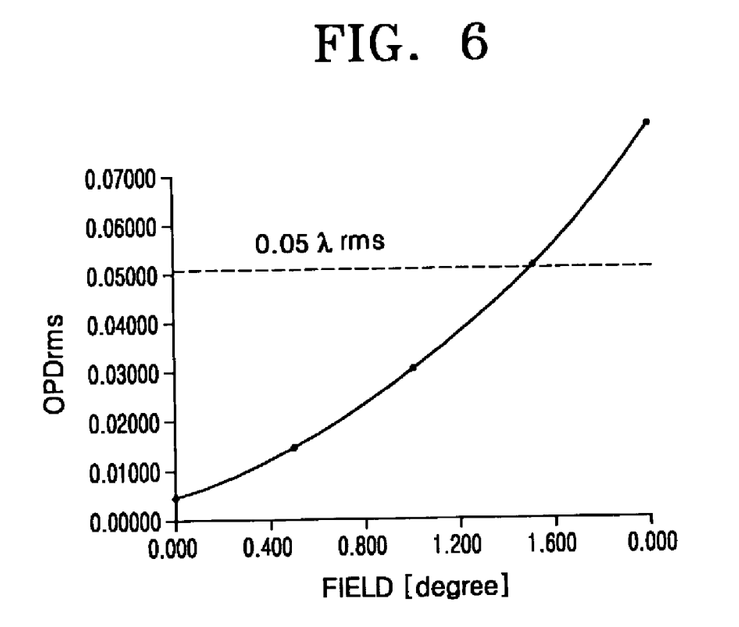
FIG. 6 shows an incident field aberration feature in an objective lens according to an embodiment of the present invention.
Figure 7:
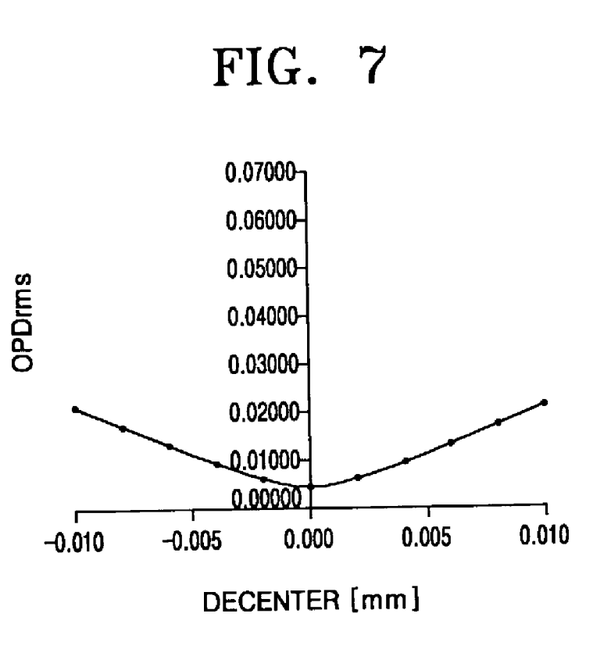
FIG. 7 shows an aberration feature according to a decenter of an objective lens according to an embodiment of the present invention.

The objective lens 81 according to an embodiment of the present invention and designed under the above conditions obtains the following optical features illustrated in FIGS. 6 and 7. As can be seen from FIG. 6, which shows an incident field aberration feature at the objective lens 81, the objective lens 81 maintains an aberration of OPD (optical path difference) of 0.05λ rms or less with respect to an incident field angle 1.5°. As can be seen from FIG. 7, which shows an aberration feature with respect to a decenter of the objective lens 81, the objective lens 81 sufficiently satisfies a condition of having an aberration of 0.035λ rms or less at ±4 μm. The objective lens 81 has a thickness allowance of 9 μm and tilt between surfaces of 4' with respect to aberration of OPD 0.035λ rms, which satisfies manufacturing allowances of a typical objective lens having a high density for a DVD family.

The optical pickup device shown in FIG. 2 according to an embodiment of the present invention further includes a collimating lens 70, which changes a divergent light beam emitted from the light source 61 into a parallel beam and is disposed between the holographic optical element 65 of the light unit 60 and the objective lens 81, and a converter unit which converts a processing path of an incident light beam emitted from the light source 61 to follow an approximately perpendicular path. While not shown, it is understood that additional items can be included in addition to or substituted for items shown in the optical pickup device in FIG. 2, such as quarter wave plates, phase control devices, beam splitters, variable aperture devices, and actuators. Further, it is understood that additional light sources can be added in order to ensure compatibility with other optical media, such as a light source providing a shorter wavelength such as 635–650 nm.

According to an aspect of the invention, the converter unit comprises a mirror 90 arranged to be inclined at about 45° with respect to an incident light beam emitted from the light source 61 and to reflect the incident light beam in a vertical direction (a height direction of the optical pickup device). The mirror 90 preferably transmits part of the incident light beam emitted from the light source 61 (several percent with respect to the central wavelength) and reflects the whole remaining light beam. The light beam transmitting through the mirror 90 is detected by a monitoring photodetector 75 arranged at one side of the mirror 90. The monitoring photodetector 75 monitors the amount of light output from the light source 61 and a monitoring signal output from the monitoring photodetector 61 is used by a controller (not shown) to control the amount of the light output from the light source 61. The light beam reflected by the mirror 90 is incident on the objective lens 81. It is understood that the mirror 90 need not be used in all aspects of the invention, and that the photodetector 75 can be located in other locations.

In the optical pickup device shown in FIG. 2, a light beam having a long wavelength is emitted by light source 61 and is transmitted through the holographic optical element 65. The transmitted light beam is converted into a parallel beam by the collimating lens 70 to be incident on the mirror 90. The mirror 90 transmits several percent of the incident light beam with respect to the central wavelength to be detected by the monitoring photodetector 75, and vertically reflects the remaining light beam to be incident on the objective lens 81.

The light beam incident on the objective lens 81 is condensed and focused on the recording surface 50a of the recording medium 50. Here, the actuator 85, which is controlled by a controller (not shown), drives the objective lens 81 in a focus direction and a tracking direction so that an information signal can be recorded/reproduced in an optimal state. The light beam reflected by the recording surface 50a of the recording medium 50 is incident on the holographic optical element 65 of the light emitter/detector unit 60 via the objective lens 81, the mirror 90, and the collimating lens 70. The incident light beam is diffracted by the holographic optical element 65 and the diffracted light is received by the photodetector 69.

Figure 8:
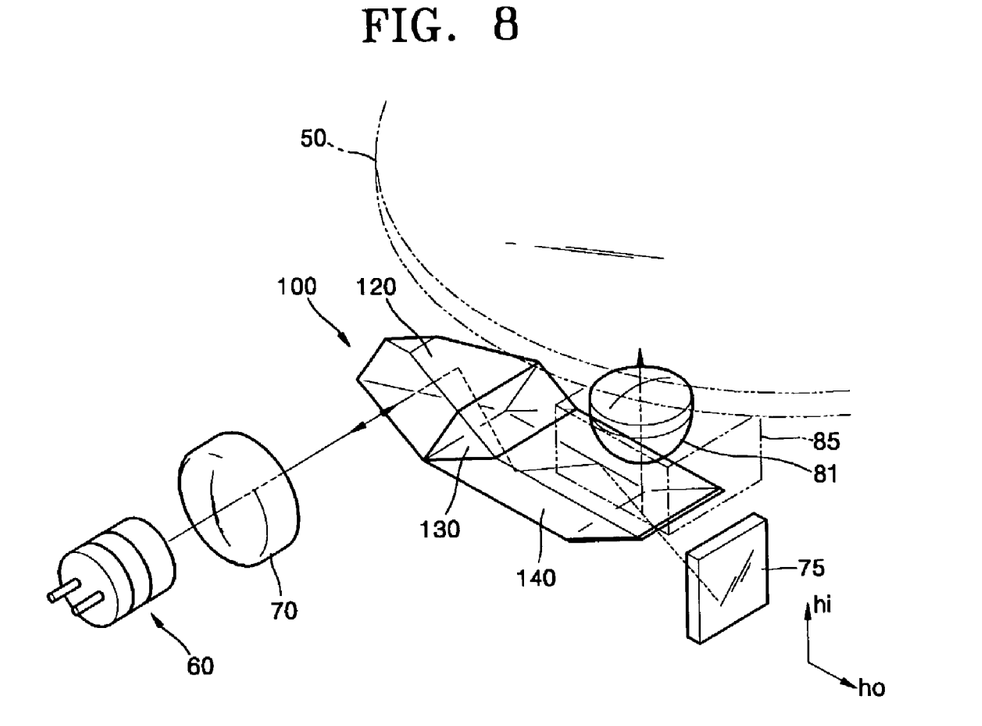
FIG. 8 is a perspective view showing an optical pickup device according to another embodiment of the present invention.
Figure 9:
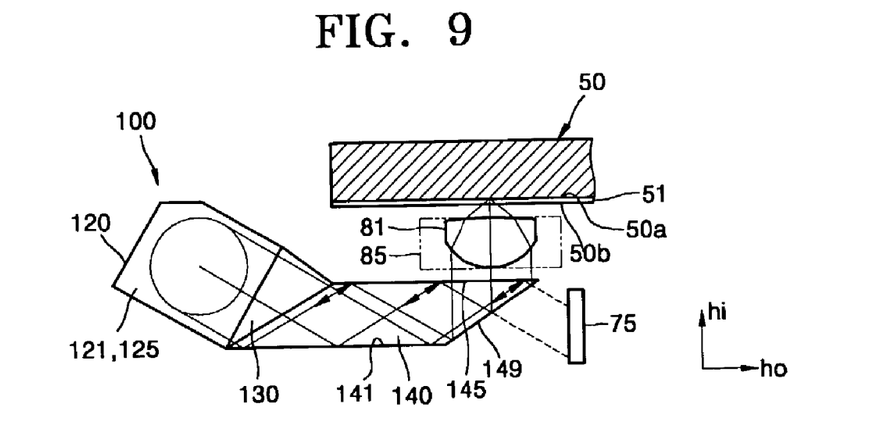
FIG. 9 is a view showing selected portions of the optical pickup device shown in FIG. 8.

FIG. 8 shows an optical pickup device according to another embodiment of the present invention. FIG. 9 shows selected portions of the optical pickup device of FIG. 8. In the embodiment shown in FIGS. 8 and 9, a reflection-type compound prism 100 is provided as a converter unit to make the optical pickup device thinner. Here, the same reference numerals as those in FIG. 2 indicate the same elements and detailed descriptions thereof will be omitted.

The reflection-type compound prism 100 reduces the size of an incident light beam emitted from the light source 61 in a height direction (hi) (i.e., in a direction perpendicular to the surface of the recording medium 50) by using a difference in angles between surfaces of the reflection-type compound prism 100. The reflection-type compound prism 100 also makes the light beam proceed in a direction parallel to the surface of the recording medium 50 (i.e., in the direction (ho). Specifically, the reflection-type compound prism 100 converts the proceeding path of the light beam to be approximately perpendicular with respect to the path incident light beam and makes the converted light beam proceed toward the objective lens 81 disposed in the height direction (hi).

The reflection-type compound prism 100 is preferably optimized to maintain or increase the size of the light beam output toward the objective lens 81 via the reflection-type compound prism 100 as compared to the size of the light beam emitted from the light source 61 and incident on the reflection-type compound prism 100, and to simultaneously minimize the thickness of the optical pickup device.

An embodiment of the reflection-type compound prism 100 is disclosed in U.S. patent application Ser. No. 10/078,459 corresponding to Korean Patent Application No 2001-23343 filed by the assignee of the present application, the disclosures of which are incorporated by reference. Thus, since the structure and function of the reflection-type compound prism 100 are shown in the above application, detailed descriptions thereof will be omitted and only a particular example will be described.

Figure 10:
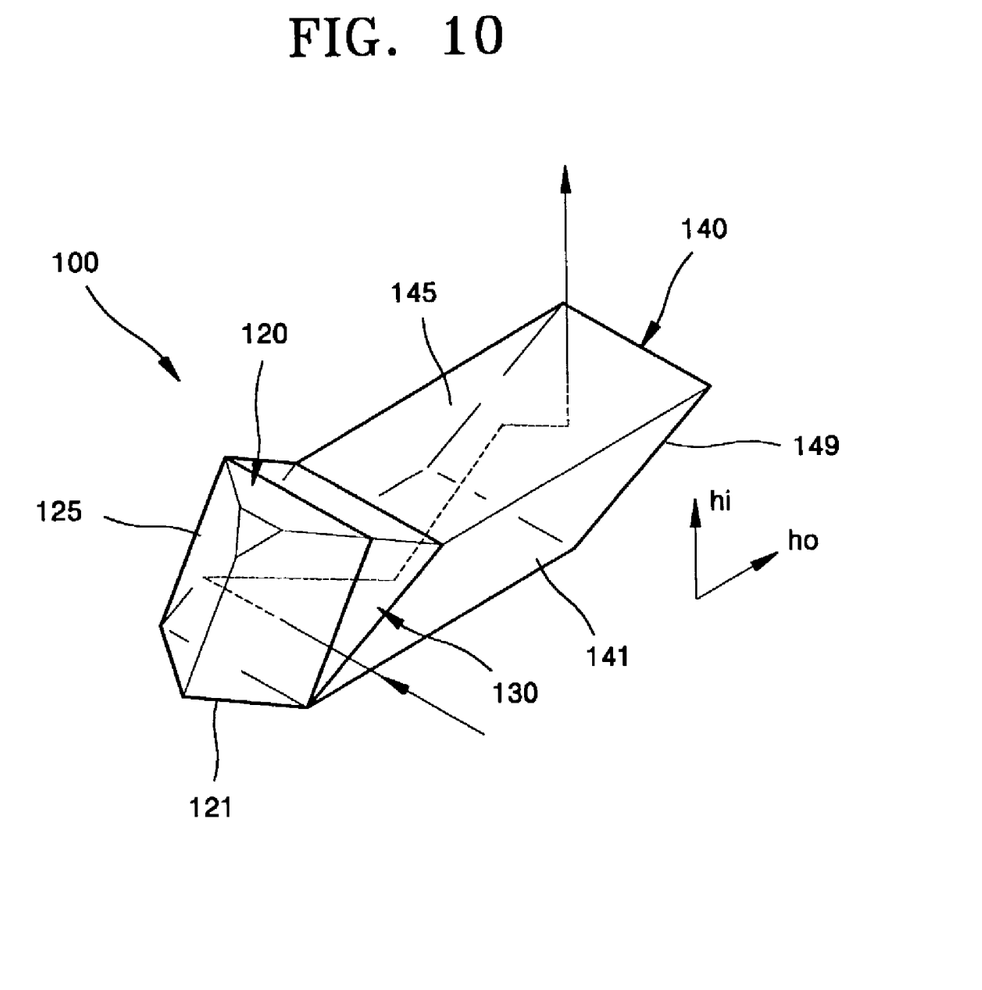
FIG. 10 is a perspective view showing an embodiment of a reflection-type compound prism for use in the optical pickup device of FIG. 8.

Referring to FIG. 10, an embodiment of the reflection-type compound prism 100 comprises a first triangular prism 120 in which three surfaces are used to move the light beam. The first prism 120 forms an isosceles triangle structure, a rhomboidal prism 140 arranged to be inclined to the first triangular prism 120. The rhomboidal prism uses four surfaces to move the light beam and form a rhomboidal structure. A second triangular prism 130, which has a right-angled triangle structure, is installed between the first triangular prism 120 and the rhomboidal prism 140.

Assuming that hi is the optical axis direction of the objective lens 81 (i.e., the height direction) and ho is a horizontal direction perpendicular to hi, the first triangular prism 120 includes a first transmission surface 121 on which a light beam emitted from the light source 61 is incident, and a first surface 125 on which the incident light beam passing through the first transmission surface 121 is reflected to be inclined downwardly with respect to the horizontal direction ho. Here, the first triangular prism 120 is preferably formed of, for example, a right-angled isosceles triangle structure so that the light beam incident on the first surface 125 can be totally reflected internally.

The rhomboidal prism 140 includes second, third, and fourth surfaces 141, 145, and 149. The second surface 141 totally and internally reflects the incident light beam reflected by the first surface 125 of the first triangular prism 120 to be inclined upwardly. The third surface 145 is disposed above the second surface 141 in the height direction hi separated a predetermined distance from the second surface 141. The third second surface 145 totally and internally reflects incident light beam reflected by the second surface 141 and, simultaneously, a size of the light beam in the height direction hi is reduced. The fourth surface 149 transmits part (approximately several percent to the central wavelength) of the incident light beam reflected by the third surface 145 to proceed toward a monitoring photodetector 75, and reflects most of the remaining light beam in the height direction hi. Here, the distance between the second and third surfaces 141 and 145 facing each other in the height direction hi is preferably less than the diameter of the light beam incident on the first transmission surface 121 of the first triangular prism 120. Thus, by decreasing the distance between the second and third surfaces 141 and 145, the light beam can be made to proceed parallel to the horizontal direction ho (i.e., the surface of the recording medium 50) while reducing the size of the light beam in the height direction hi.

The shown fourth surface 149 forms an angle of less than 45° with respect to the horizontal direction ho, and preferably, within a range of 20°–40°. Here, since the fourth surface 149 does not satisfy a condition of total internal reflection with respect to the incident light beam because of the structure of the rhomboidal prism 140, a controlling reflection coating can be used to transmit part of the incident light beam while reflecting most of the remaining light beam.

The second triangular prism 130 makes the light beam reflected to be inclined downwardly by the first surface 125 of the first triangular prism 120 proceed straight to be input inside the rhomboidal prism 140.

The reflection-type compound prism 100 having the above structure is arranged such that the incident light beam emitted from the light source 61 proceeds within the reflection-type compound prism 100 with a reduced size in the height direction hi under the actuator 85 by using a difference in angles between the surfaces of the first triangular prism 120 and the rhomboidal prism 140, and is reflected to proceed toward the objective lens 81 disposed in the height direction hi. Specifically, since the reflection-type compound prism 100 has the structure of proceeding the incident light beam by reducing the size in the height direction hi between the second and third surfaces 141 and 145 of the rhomboidal prism 140, in view of the height direction hi, the first triangular prism 120 of the reflection-type compound prism 100 protrudes above the rhomboidal prism 140. Thus, to form a thinner optical pickup device, the reflection-type compound prism 100 is arranged such that the rhomboidal prism 140, in particular, the third surface 145 thereof, is disposed under that actuator 85. The actuator 85 is formed such that the above arrangement is possible. By arranging the rhomboidal prism 140 as above, since at least part of the objective lens 81 can be disposed lower than the top end portion of the light beam emitted from the light source 61 and incident on the reflection-type compound prism 100, the effective thickness of the reflection-type compound prism 100 having influence on the thickness of the optical pickup device is substantially the distance between the second and third surfaces 141 and 145.

According to an aspect of the invention, a size of the light beam proceeding from the reflection-type compound prism 100 to the objective lens 81 remains substantially the same or is increased as compared to the size of the light beam incident on the reflection-type compound prism 100. As such, an optimal thickness of the rhomboidal prism 140 of the reflection-type compound prism 100 depends on the angle made by the fourth surface 149 with respect to the horizontal direction ho. Thus, the thickness of the optical pickup device in the height direction hi can be reduced as much as the angle of the fourth surface 149 to the horizontal direction ho decreases.

When the above reflection-type compound prism 100 is used, the incident light beam having a large diameter output from the light source 61 and incident upon the reflection-type compound prism 100 passes the lower portion of the actuator 65 to be lower than the diameter, and resumes its original diameter by being reflected by the fourth surface 149 of the rhomboidal prism 140.

As described above, the optical pickup device according to the present invention is formed of a single unit. In the optical recording/reproducing apparatus using the same, seeking a track is performed while the optical pickup device is moved from the inner circumference of the recording medium 50 toward the outer circumference and an information signal is recorded/reproduced to a desired track by using the optical pickup device.

Here, although the optical pickup device according to the present invention is described in the above description and illustrations to include the holographic optical element 65 as an optical path changer and then the light emitter/detector unit 60 in which the light source 61, the optical path changer, and the photodetector 69 are optically modulated, the present invention is not limited thereto. That is, in the optical pickup device according to the present invention, any optical device known in the technical field to which the present invention pertains can be used as the optical path changer. For example, a plate or cubic beam splitter or a combination of a polarizing beam splitter and a ¼ wave plate can be provided as the optical path changer.

The recording medium 50 used in the optical pickup device according to the present invention is a new format having a recording density greater than that of a DVD family (i.e., having a recording capacity of at or more than 2 gigabytes of data). Preferably, the recording medium 50 has the recording surface 50a which is formed of a material suitable for a long wavelength more than 650 nm, preferably, 700 nm or more, so that a reproduction signal by the reflectance of the recording surface 50a is optimized. The recording surface 50a is formed on the substrate 53. Also, the thickness of the transparent protective layer 51 above the substrate 53, which protects the recording surface 50a of the recording medium 50, is preferably within a range of 40 nm–0.6 mm.

Thus, the recording medium 50 which can be used in the optical pickup device according to the present invention can use the same long wavelength region as the recording medium of a CD family which has already been verified. Thus, the recording medium 50 can be formed of a material having the characteristic same as or similar to a recording medium of a CD family, such as an organic dye used in a CD-R or a phase change material used in a CD-R/W as outlined in the Orange Book. Also, the thickness of the protective layer 51 can be selected from a range between 0.6 mm to tens of nanometers, for example, 40 nm, corresponding to a working distance according to design of the objective lens 81.

To overcome the limitation of the conventional objective lens formed of a single lens and the problem of the conventional objective lens formed of two lenses shown in FIG. 1, the optical pickup device according to the present invention includes an improved objective lens formed of a single lens having an NA of 0.7 or more and an inexpensive light source for a long wavelength. Thus, according to the present invention, high density recording/reproducing greater than a DVD family is possible and an inexpensive and high performance optical recording/reproducing apparatus can be realized. In particular, although a high power light source for a long wavelength used in the conventional recording medium of a CD family is used, high density recording/reproducing greater than a DVD family is possible. Also, when a conventional inexpensive and high power 780 nm holographic laser module is used, the number of parts can be reduced and the price of the apparatus can be lowered.

Also, according to the present invention, the recording medium has a recording density greater than that of the DVD family. Since the recording medium can be formed of a material having a characteristic which is the same as or similar to a recording medium of a CD family using a long wavelength which has already been verified, reliability can be secured and a lower price is possible. Also, by using the thickness of the transparent protective layer 51 of the recording medium within a range of 40 nm–0.6 mm, the working distance can be reduced much so that a compact optical pickup device and an optical recording/reproducing apparatus using the same can be achieved. Further, by using a single lens, a small objective lens having a short working distance can be easily manufactured. Therefore, by using the optical pickup device and/or recording medium according to the present invention, a compact high density optical recording/reproducing apparatus which is inexpensive and has high performance can be realized.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup device for use in recording and/or reproducing data with a recording medium, comprising:
    a light emitter/detector unit to emit a light beam having a wavelength longer than 650 nm to be focused on the recording medium and to receive and detect the light beam after being reflected by the recording medium; and
    an objective lens formed of a single tens having a numerical aperture (NA) of 0.7 or more and which forms a light spot on the recording medium by condensing the light beam received from said emitter/detector light unit.

2. The optical pickup device as claimed in claim 1, wherein the recording medium has a recording density of at least that of a digital versatile disc (DVD).

3. The optical pickup device as claimed in claim 2, wherein:
    the wavelength longer than 650 nm is a wavelength of 700 nm or more, and
    a recording surface of the recording medium is formed of a material suitable for the wavelength of 700 nm or more so that a reproduction signal by a reflectance of the recording surface is optimized.

4. The optical pickup device as claimed in claim 3, wherein a thickness of the recording medium measured from a light incident surface to a recording surface is at or between 40 nm and 0.6 mm.

5. The optical pickup device as claimed in claim 2, wherein a thickness of the recording medium measured from a light incident surface to a recording surface is at or between 40 nm and 0.6 mm.

6. The optical pickup device as claimed in claim 1, wherein said light emitter/detector unit emits a light beam having a wavelength of 700 nm or more.

7. The optical pickup device as claimed in claim 6, wherein said light emitter/detector unit comprises an optical module comprising:

a light source to emit the light beam having the wavelength of 700 nm or more,
a photodetector to receive and detect the light beam reflected by the recording medium and having passed through said objective lens, and
a holographic optical element to one of transmit and diffract the light beam between said objective lens and said light source, and to another one of transmit and diffract the reflected light beam between said objective lens and said photodetector.

8. The optical pickup device as claimed in claim 1, wherein a working distance of said objective lens is less than a thickness of a center of said objective lens.

9. The optical pickup device as claimed in claim 8, wherein a working distance (WD) of said objective lens is as follows:

$$WD \leq \alpha BW - 0.2T,$$

BW is a diameter of the incident light beam,
T is the thickness of the center of said objective lens,
$\alpha = 1/(2 \tan \theta)$, and
$\theta \mathrm{Arc}\, \sin(NA)$.

10. The optical pickup device as claimed in claim 8, wherein:
the thickness of the center of said objective lens is 0.6 times or more an effective diameter of said objective lens, and
the effective diameter being a diameter of said objective lens which focuses the incident light beam.

11. The optical pickup device as claimed in claim 8, wherein:
said objective lens satisfies at least one of the following conditions:
an effective diameter of 2.0 mm or less,
a maximum inclination angle of 55° or less, and
having two aspherical surfaces, and
the effective diameter is a diameter of said objective lens which focuses the incident light beam.

12. The optical pickup device as claimed in claim 1, wherein:
a thickness of a center of said objective lens is 0.6 times or more an effective diameter of said objective lens, and
the effective diameter being a diameter of said objective lens which focuses the incident light beam.

13. The optical pickup device as claimed in claim 12, wherein a working distance (WD) of said objective lens is as follows:

$$WD \leq \alpha BW - 0.2T,$$

BW is a diameter of the incident light beam,
T is the thickness of the center of said objective lens,
$\alpha = 1/(2 \tan \theta)$, and
$\theta \mathrm{Arc}\, \sin(NA)$.

14. (Original) The optical pickup device as claimed in claim 12, wherein said objective lens satisfies at least one of the following conditions:
the effective diameter being 2.0 mm or less,
a maximum inclination angle of 55° or less, and
having two aspherical surfaces.

15. The optical pickup device as claimed in claim 1, wherein;
said objective lens satisfies at least one of the following conditions:
an effective diameter of 2.0 mm or less,
a maximum inclination angle of 55° or less, and
having two aspherical surfaces, and
the effective diameter is a diameter of said objective lens which focuses the incident light.

16. The optical pickup device as claimed in claim 1, wherein said light emitter/detector unit comprises an optical module comprising:
a light source to emit the light beam having the wavelength longer than 650 nm,
a photodetector to receive and detect the light beam reflected by the recording medium and having passed through said objective lens, and
a holographic optical element to one of transmit and diffract the light beam between said objective lens and said light source, and to another one of transmit and diffract the reflected light beam between said objective lens and said photodetector.

17. The optical pickup device as claimed in claim 1, further comprising a mirror between said light emitter/detector unit and said objective lens and which reflects the light beam onto a substantially perpendicular optical path.

18. The optical pickup device as claimed in claim 1, further comprising a reflection-type compound prism provided between said light emitter/detector unit and said objective lens, wherein said reflection-type compound prism
makes an incident light beam input from said light emitter/detector unit proceed within said prism at a reduced size in a height direction using a difference in angles between surfaces of said reflection-type compound prism, and
changes an optical path of the incident light beam to proceed within said reflection-type compound prism towards said objective lens in a direction substantially perpendicular to the path of the incident light beam so as to exit said reflection-type compound prism to be incident on said objective lens.

19. The optical pickup device as claimed in claim 18, wherein a part of said objective lens is disposed lower than a top end portion of the incident light beam when incident on said reflection-type compound prism.

20. The optical pickup device as claimed in claim 1, wherein the recording medium has a recording capacity of at or more than 2 gigabytes of data.

21. A recording medium comprising:
a recording density of at least that of a digital versatile disc (DVD); and
a material suitable for recording data using light having a wavelength of 700 nm or more so that a reproduction signal created by a reflectance of a recording surface is optimized.

22. The recording medium as claimed in claim 21, wherein a thickness of the recording medium from a light incident surface to a recording surface is at or between 40 nm and 0.6 mm.

23. The recording medium as claimed in claim 22, wherein the recording medium is formed of a material having a characteristic which is the same as or similar to that of a recordable compact disc (CD).

24. The recording medium as claimed in claim 21, wherein the recording medium is formed of a material having a characteristic which is the same as or similar to that of a recordable compact disc (CD).

25. The recording medium as claimed in claim 21, wherein the recording medium has a recording capacity of at or more than 2 gigabytes of data.

26. An optical pickup device for use in recording and/or reproducing data with a recording medium, comprising:
a light source to produce a light beam having a wavelength longer than 650 nm;

an objective lens having a numerical aperture (NA) of 0.7 or more and which uses only two surfaces to focus the light beam received from said light source to form a light spot on the recording medium; and a light detector which receives and detects the light beam reflected from the recording medium.

27. The optical pickup device as claimed in claim 26, wherein the recording medium has a recording capacity of at or more than 2 gigabytes of data.

28. The optical pickup device as claimed in claim 27, wherein the portion of said objective lens through which the light beam focused by the two surfaces passes is a solid material connecting the two surfaces.

29. The optical pickup device as claimed in claim 28, wherein the solid material has a common refractive index.

30. The optical pickup device as claimed in claim 26, wherein one of the two surfaces comprises an aspherical surface.

31. The optical pickup device as claimed in claim 30, wherein the other of the two surfaces comprises another aspherical surface.

32. The optical pickup device as claimed in claim 26, wherein a thickness of the recording medium from a light incident surface to a recording surface is at or between 40 nm and 0.6 mm.

33. The optical pickup device as claimed in claim 26, wherein a working distance (WD) from said objective lens to the recording medium is as follows:

$$WD \leq \alpha BW - 0.2T,$$

BW is a diameter of an incident light beam,
T is a thickness of the center of said objective lens,
$\alpha = 1/(2 \tan \theta)$, and
$\theta = \text{Arc} \sin(NA)$.

34. The optical pickup device as claimed in claim 33, further comprising an optical path changing device providing an optical path for the light beam between said light source to said objective lens and another optical path for the reflected light beam between said objective lens and said light detector.

35. The optical pickup device as claimed in claim 34, further comprising a prism to transmit the light beam from said optical path changing device and said objective lens, wherein:

a size of the light beam output from said prism through an output surface to be incident on said objective lens is at or greater than a size of the light beam input through an input surface into said prism from said optical path changing device, and the light beam has a reduced size within said prism between the input and output surfaces.

36. The optical pickup device as claimed in claim 35, wherein said prism changes a direction of the incident light beam to follow an approximately perpendicular path upon exiting the output surface.

37. A recording medium comprising:

a substrate;

a recording layer disposed on said substrate and comprising a material suitable for recording data using light having a wavelength of 700 nm or more; and a protective layer which is disposed on said recording layer and transmits incident light, said protective layer having a thickness that is at or between 40 nm and 0.6 mm.

38. The recording medium as claimed in claim 37, wherein said recording layer comprises an organic dye having a characteristic of a CD-R.

39. The recording medium as claimed in claim 37, wherein said recording layer comprises a phase change material having a characteristic of a CD-R/W.

40. The recording medium as claimed in claim 37, wherein the recording medium has a recording capacity of at or more than 2 gigabytes of data.

* * * * *

UNITED STATES PATENT AND TRADEMARK OFFICE
CERTIFICATE OF CORRECTION

PATENT NO. : 7,072,254 B2  Page 1 of 1
APPLICATION NO. : 10/217330
DATED : July 4, 2006
INVENTOR(S) : Dae-sik Kim et al.

It is certified that error appears in the above-identified patent and that said Letters Patent is hereby corrected as shown below:

PTO - Title Page, Item (57) Abstract, line 5, change "tens" to -- lens --

PTO - Column 12, line 38, change "tens" to -- lens --

PTO - Column 13, line 55, delete "(Original)"

Signed and Sealed this

Nineteenth Day of December, 2006

JON W. DUDAS
*Director of the United States Patent and Trademark Office*